United States Patent
Dixit et al.

(10) Patent No.: US 11,030,772 B2
(45) Date of Patent: Jun. 8, 2021

(54) POSE SYNTHESIS

(71) Applicant: Microsoft Technology Licensing, LLC, Redmond, WA (US)

(72) Inventors: Mandar Dilip Dixit, Seattle, WA (US); Bo Liu, San Diego, CA (US); Gang Hua, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 16/429,696

(22) Filed: Jun. 3, 2019

(65) Prior Publication Data
US 2020/0380720 A1 Dec. 3, 2020

(51) Int. Cl.
| | |
|---|---|
| *G06K 9/00* | (2006.01) |
| *G06T 7/73* | (2017.01) |
| *G06T 7/194* | (2017.01) |
| *G06T 7/50* | (2017.01) |
| *G06T 7/168* | (2017.01) |
| *G06T 7/174* | (2017.01) |
| *G06N 20/00* | (2019.01) |

(52) U.S. Cl.
CPC .............. *G06T 7/74* (2017.01); *G06N 20/00* (2019.01); *G06T 7/168* (2017.01); *G06T 7/174* (2017.01); *G06T 7/194* (2017.01); *G06T 7/50* (2017.01); *G06T 2207/20081* (2013.01)

(58) Field of Classification Search
CPC ....... G06T 11/60; G06T 11/001; G06T 5/006; G06T 5/20; G06T 5/50; G06T 3/4038; G06T 7/74; G06T 7/194; G06K 9/00228; H04N 1/3876; H04N 5/23238
See application file for complete search history.

(56) References Cited

U.S. PATENT DOCUMENTS

| | | | | |
|---|---|---|---|---|
| 8,385,971 | B2* | 2/2013 | Rhoads | G06K 9/4604 |
| | | | | 455/556.1 |
| 8,587,583 | B2* | 11/2013 | Newcombe | G06T 17/00 |
| | | | | 345/420 |
| 8,730,157 | B2* | 5/2014 | Sankarasubramaniam | ................. |
| | | | | G06K 9/00355 |
| | | | | 345/156 |

(Continued)

FOREIGN PATENT DOCUMENTS

CN 108475330 A 8/2018

OTHER PUBLICATIONS

Abarghouei, et al., "Real-Time Monocular Depth Estimation using Synthetic Data with Domain Adaptation via Image Style Transfer", In Proceedings of the IEEE Conference on Computer Vision and Pattern Recognition, Jun. 18, 2018, 11 Pages.

(Continued)

*Primary Examiner* — Amir Alavi
(74) *Attorney, Agent, or Firm* — Alleman Hall Creasman & Tuttle LLP

(57) ABSTRACT

Examples are disclosed that relate to computing devices and methods for synthesizing a novel pose of an object. One example provides a method comprising receiving a reference image of an object corresponding to an original viewpoint. The reference image of the object is translated into a depth map of the object, and a new depth map of the object is synthesized to correspond to a new viewpoint. A new image of the object is generated from the new viewpoint based on the new depth map of the object and the reference image of the object.

18 Claims, 12 Drawing Sheets

(56) References Cited

U.S. PATENT DOCUMENTS

| | | | | |
|---|---|---|---|---|
| 8,861,800 | B2* | 10/2014 | Sawides | G06K 9/00201 |
| | | | | 382/118 |
| 8,971,612 | B2* | 3/2015 | Shotton | G06K 9/6255 |
| | | | | 382/159 |
| 9,443,350 | B2* | 9/2016 | Wagner | G06T 17/00 |
| 10,242,458 | B2* | 3/2019 | Nash | G06T 7/33 |
| 10,567,449 | B2* | 2/2020 | Harner | G06T 19/20 |
| 10,665,020 | B2* | 5/2020 | Gribetz | G06T 19/006 |
| 2011/0143811 | A1* | 6/2011 | Rodriguez | H04N 1/00127 |
| | | | | 455/556.1 |
| 2017/0061253 | A1* | 3/2017 | Burgos | G06T 7/70 |

OTHER PUBLICATIONS

Busto, et al., "Open set domain adaptation", In Proceedings of the IEEE International Conference on Computer Vision, Oct. 22, 2017, pp. 754-763.

Chang, et al., "ShapeNet: An information-Rich 3D Model Repository", In Journal of the Computing Research Repository, Dec. 9, 2015, pp. 1-11.

Choy, et al., "3dr2n2: A unified approach for single and multi-view 3d object reconstruction", In European conference on computer vision, Oct. 8, 2016, 17 Pages.

Donahue, et al., "Decaf: A deep convolutional activation feature for generic visual recognition", In Proceedings of the 31th International Conference on Machine Learning, Jun. 21, 2014, 9 Pages.

Fachada, et al., "Depth Image Based View Synthesis with Multiple Reference Views for Virtual Reality", In Proceeding of 3DTV-Conference: The True Vision-Capture, Transmission and Display of 3D Video, Jun. 3, 2018, 4 Pages.

Fan, et al., "A point set generation network for 3d object reconstruction from a single image", In Proceedings of the IEEE conference on computer vision and pattern recognition, Jul. 21, 2017, pp. 605-613.

Gadelha, et al., "3D Shape Induction from 2D Views of Multiple Objects", In Proceeding of International Conference on 3D Vision (3DV), Oct. 10, 2017, 11 Pages.

Gebru, et al., "Fine-grained recognition in the wild: A multi-task domain adaptation approach", In Proceedings of the IEEE International Conference on Computer Vision, Sep. 7, 2017, pp. 1349-1358.

Geiger, et al., "Vision meets robotics: The kitti dataset", In International Journal of Robotics Research, vol. 32, Issue 11, Sep. 2013, pp. 1231-1237.

Guler, et al., "Densepose: Dense human pose estimation in the wild", In Proceedings of the IEEE Conference on Computer Vision and Pattern Recognition, Jun. 18, 2018, pp. 7297-7306.

Hoffman, et al., "Cross-modal adaptation for rgb-d detection", In Proceedings of IEEE International Conference on Robotics and Automation, May 16, 2016, pp. 5032-5039.

Hoffman, et al., "Cycada: Cycle-consistent adversarial domain adaptation", In Journal of Computing Research Repository, Nov. 2017, pp. 1-15.

Isola, et al., "Image-to-image translation with conditional adversarial networks", In Proceedings of the IEEE conference on computer vision and pattern recognition, Jul. 21, 2017, pp. 1125-1134.

Kim, et al., "Learning to discover cross-domain relations with generative adversarial networks", In Proceedings of the 34th International Conference on Machine Learning—vol. 70, Aug. 6, 2017, 10 Pages.

Lai, et al., "A large-scale hierarchical multi-view rgb-d object dataset", In Proceedings of IEEE International Conference on Robotics and Automation, May 9, 2011, 8 Pages.

Li, et al., "Dense Intrinsic Appearance Flow for Human Pose Transfer", In Journal of Computing Research Repository, Mar. 2019, 17 Pages.

Liu, et al., "Deepfashion: Powering robust clothes recognition and retrieval with rich annotations", In Proceedings of the IEEE conference on computer vision and pattern recognition, Jun. 27, 2016, pp. 1096-1104.

Liu et al., "Geometry-Aware Deep Network for Single-Image Novel View Synthesis", In Proceeding of IEEE/CVF Conference on Computer Vision and Pattern Recognition, Jun. 18, 2018, 9 Pages.

Liu, et al., "Unsupervised image-toimage translation networks", In Advances in Neural Information Processing Systems, Dec. 4, 2017, 9 Pages.

Long, et al., "Fully convolutional networks for semantic segmentation", In Proceedings of IEEE Conference on Computer Vision and Pattern Recognition, Jun. 7, 2015, pp. 3431-3440.

Ma, et al., "Pose guided person image generation", In Proceedings of Advances in Neural Information Processing Systems, Dec. 4, 2017, 11 Pages.

Neverova, et al., "Dense pose transfer", In Proceedings of the European Conference on Computer Vision, Sep. 8, 2018, pp. 1-20.

Park,, et al., "Transformation-grounded image generation network for novel 3d view synthesis", In Proceedings of the IEEE conference on computer vision and pattern recognition, Jul. 21, 2017, pp. 1-17.

Rad, et al., "Domain transfer for 3d pose estimation from color images without manual annotations", In Journal of Computing Research Repository, Oct. 2018, pp. 1-16.

Rematas, et al., "Novel Views of Objects from a Single Image", In Proceeding of IEEE Transactions on Pattern Analysis and Machine Intelligence, vol. 39, Issue 8, Aug. 2017, pp. 1-14.

Salimans, et al., "Improved techniques for training gans", In Proceedings of Advances in Neural Information Processing Systems, Dec. 5, 2016, pp. 1-10.

Sankaranarayanan, et al., "Generate to adapt: Aligning domains using generative adversarial networks", In Proceedings of IEEE Conference on Computer Vision and Pattern Recognition, Jun. 18, 2018, pp. 8503-8512.

Sun, et al., "Multi-view to novel view: Synthesizing novel views with self-learned confidence", In Proceedings of 15th European Conference on Computer Vision, Sep. 8, 2018, pp. 1-17.

Sun, et al., "Pix3d: Dataset and methods for single-image 3d shape modeling", In Proceedings of IEEE Conference on Computer Vision and Pattern Recognition, Jun. 18, 2018, pp. 2974-2983.

Tatarchenko, et al., "Multi-view 3d models from single images with a convolutional network", In Proceedings of 14th European Conference on Computer Vision, Oct. 11, 2016, pp. 1-20.

Tatarchenko, et al., "Single-view to multi-view: Reconstructing unseen views with a convolutional network", In Journal of Computing Research Repository, Nov. 2015, pp. 1-9.

Tzeng, et al., "Adversarial discriminative domain adaptation", In Proceedings of 5th International Conference on Learning Representations, Apr. 24, 2017, 10 Pages.

Wu, et al., "3d shapenets: A deep representation for volumetric shapes", In Proceedings of IEEE Conference on Computer Vision and Pattern Recognition, Jun. 7, 2015, 9 Pages.

Wu, et al., "Marrnet: 3d shape reconstruction via 2.5 d sketches", In Proceedings of 31st Conference on Neural Information Processing Systems, Dec. 4, 2017, pp. 1-11.

Yang, et al., "Weakly-supervised Disentangling with Recurrent Transformations for 3D View Synthesis", In Proceedings of Advances in Neural Information Processing Systems, Dec. 7, 2015, pp. 1-11.

Zhang, et al., "Curriculum domain adaptation for semantic segmentation of urban scenes", In Proceedings of IEEE International Conference on Computer Vision, Oct. 22, 2017, 12 Pages.

Zhao, et al., "Multi-view image generation from a single-view", In Proceedings of the 26th ACM international conference on Multimedia, Oct. 22, 2018, pp. 383-391.

Zhou, et al., "Unsupervised Learning of Depth and Ego-Motion from Video", In Proceeding of IEEE Conference on Computer Vision and Pattern Recognition, Jul. 21, 2017, 10 Pages.

Zhou, et al., "View synthesis by appearance flow", In Proceedings of 14th European Conference on Computer Vision, Oct. 11, 2016, pp. 1-16.

Zhu, et al., "Unpaired Image-to-Image Translation using Cycle-Consistent Adversarial Networks", In Proceedings of IEEE International Conference on Computer Vision, Oct. 22, 2017, pp. 1-18.

Zhu, et al., "View Extrapolation of Human Body from a Single Image", In Proceedings of the IEEE/CVF Conference on Computer Vision and Pattern Recognition, Jun. 18, 2018, pp. 4450-4459.

(56) References Cited

OTHER PUBLICATIONS

Guo, et al., "Learning Monocular Depth by Distilling Cross-Domain Stereo Networks", In Proceedings of the European Conference on Computer Vision, Oct. 6, 2018, 17 Pages.
"International Search Report and Written Opinion Issued in PCT Application No. PCT/US20/028608", dated Oct. 19, 2020, 15 Pages.
Chen, et al., "CrDoCo: Pixel-Level Domain Transfer with Cross-Domain Consistency", In Proceedings of the IEEE Conference on Computer Vision and Pattern Recognition, Jun. 15, 2019, pp. 1791-1800.
Furihata, et al., "Novel View Synthesis with Residual Error Feedback for FTV", In Proceedings of SPIE—The International Society for Optical Engineering, Feb. 18, 2010.

* cited by examiner

POSE SYNTHESIS

BACKGROUND

An object viewed from varying angles may span a manifold in a space of images. Characterizing these manifolds may be useful in the field of computer vision, including 3D scene understanding and view-invariant object recognition. However, these manifolds may be difficult to learn.

SUMMARY

Examples are disclosed that relate to computing devices and methods for synthesizing a novel pose of an object. One example provides a method comprising receiving a reference image of an object corresponding to an original viewpoint. The reference image of the object is translated into a depth map of the object, and a new depth map of the object is synthesized to correspond to a new viewpoint. A new image of the object is generated from the new viewpoint based on the new depth map of the object and the reference image of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, an object viewed from varying angles may span a manifold in a space of images. Characterizing these manifolds may be useful in the field of computer vision, including 3D scene understanding and view-invariant object recognition.

However, these manifolds may be difficult to learn. For example, many object datasets do not contain a dense sampling of different object views. Some popular datasets, such as ImageNet (accessible from image-net.org) and Common Objects in Context (COCO, accessible from cocodataset.org) favor diversity of objects per class over diversity of views of any single object, as a dense set of different views of each object in a diverse object dataset may be labor-intensive to capture. In contrast, synthetic image datasets, such as ModelNet (Z. Wu, S. Song, A. Khosla, F. Yu, L. Zhang, X. Tang, and J. Xiao, "3D ShapeNets: A Deep Representation for Volumetric Shapes", Proceedings of the IEEE conference on computer vision and pattern recognition, pages 1912-1920, 2015) or ShapeNet (A. X. Chang, T. Funkhouser, L. Guibas, P. Hanrahan, Q. Huang, Z. Li, S. Savarese, M. Savva, S. Song, H. Su, et al. "ShapeNet: An Information-Rich 3D Model Repository", arXiv: 1512.03012, 2015), may include large numbers of object views. However, such synthetic image datasets may have a large gap to the domain of natural images. Accordingly, models learned from synthetic data may be difficult to use in a natural world.

As it may be difficult to obtain natural image datasets with dense view sampling, one possible solution to the modeling of pose manifolds may be based on domain adaptation or transfer. Domain transfer methods have been used for problems such as object recognition image segmentation or image-to-image translation. However, domain transfer generally focuses on transferring images, image regions or features across domains.

Figure 1:
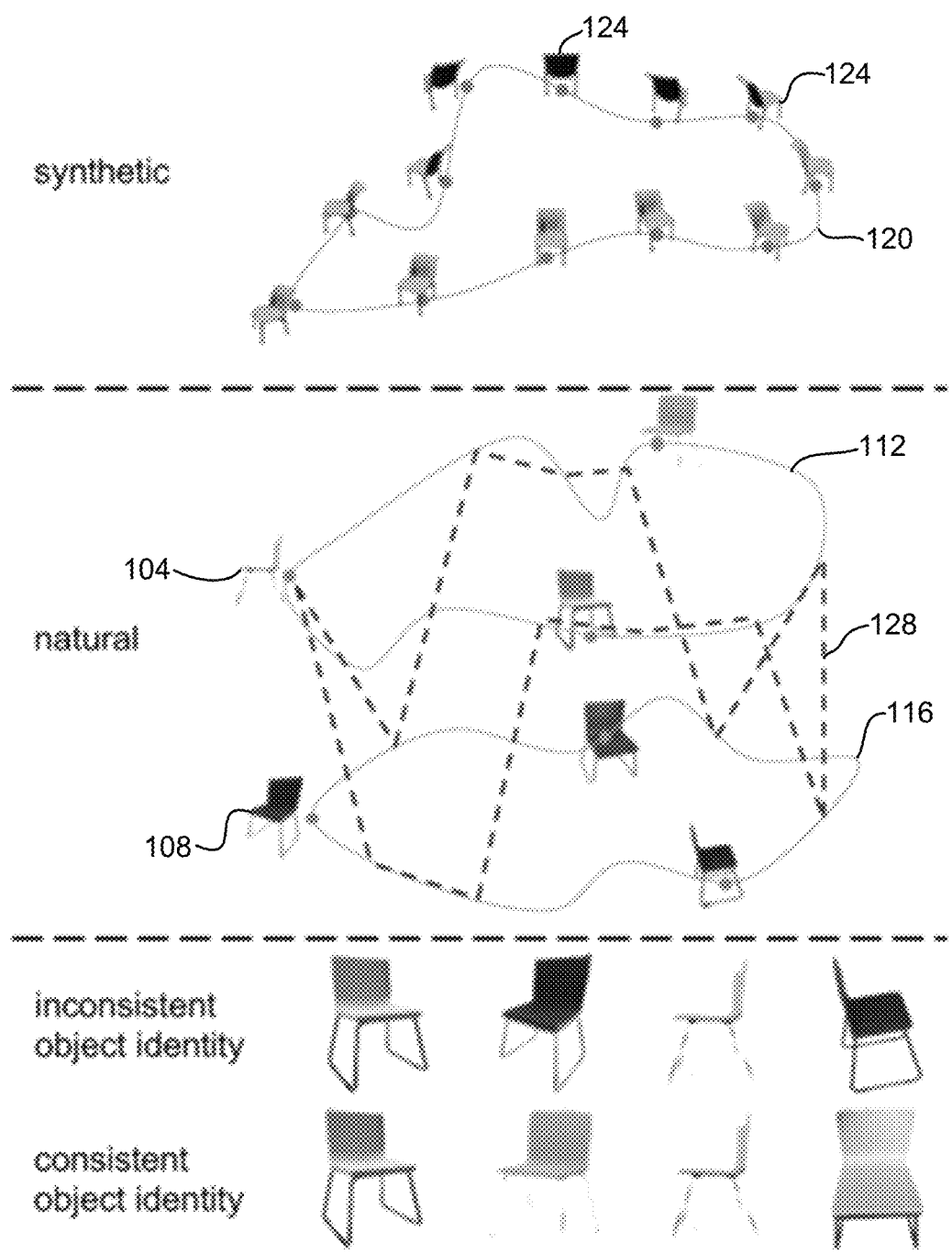
FIG. 1 shows an example of two objects of equal shape but different appearance and their trajectory in image space as a function of view angle.

Thus, a potential solution to the pose manifold modeling problem may be to integrate these techniques with methods for novel view synthesis, which have shown promise with synthetic data. Such a method may include using view synthesis to generate pose trajectories in a synthetic domain, and then using domain transfer techniques to map individual views to a natural image domain. However, these techniques may not preserve object identity across views. This issue is illustrated in FIG. 1, which shows a first object 104 and a second object 108, which have equal shapes but different appearances. FIG. 1 shows a first trajectory 112 of poses for the first object 104 and a second trajectory 116 of poses for the second object 108 in a natural image space as a function of view angle. Also shown is a synthetic trajectory 120 spanned by synthetic images 124 of a CAD model of the objects. A densely sampled set of synthetic object views may be transferred to the natural image space of objects 104 and 108, where sparse views are available. However, as the CAD model may not characterize each natural object's appearance, the trajectories of each of the objects 104, 108 may map into a single trajectory 128 in the synthetic domain, as indicated by a dashed line in the natural image trajectory. As a result, views synthesized along the trajectory 128 may oscillate between depicting objects of similar shape but different appearance, as shown in the bottom of FIG. 1.

To overcome such issues, consistent object identity may be obtained by transferring an entire pose trajectory across domains, rather than transferring independent views. This approach may have similarities to techniques that involve the hallucination of view changes on images of a scene. However, methods that hallucinate view changes may assume dense view supervision, which may only be available in synthetic or video domains.

Accordingly, examples are disclosed that relate to pose trajectory transfer to perform novel view synthesis when only one or a few images of a target object are available, as is common in natural image datasets. The disclosed examples may allow for the production of novel views based upon sparse target object image data, while preserving identity across views.

Novel view synthesis as disclosed herein may be considered a special case of image-to-image transfer, where a source and a target image represent different views. Several methods have been proposed for novel view synthesis. However, these methods may explicitly infer shape from 2D image data. Further, while image transfer may aim to synthesize style or texture, view transfer may "hallucinate" unseen shape information.

Several methods have also been proposed for domain adaptation of visual tasks. Generic domain adaptation may aim to bridge the synthetic and natural domains by aligning their statistics. Some examples of domain adaptation approaches fuse color and depth features for pose estimation. In contrast, as described in more detail below, the examples disclosed herein may use image-to-image transfer to leverage viewpoint supervision, which may be used to decouple appearance and shape, and recover object identity. In this manner, unsupervised domain transfer may be implemented, leveraging depth information to bridge the natural and synthetic domains and perform bi-directional transfer.

Other approaches to novel view synthesis than the examples disclosed herein have been proposed. Some methods generate pixels in a target view by using auto-encoders or recurrent networks. To eliminate some artifacts of these approaches, an appearance flow-based transfer module may reconstruct the target view with pixels from a source view and a dense flow map. However, such methods may not be able to hallucinate pixels missing in the source view. Other methods may utilize an image completion module implemented after flow-based image reconstruction to compensate for the pixels missing in the source view, along with independent modules to predict dense flow and pixel hallucination. However, these methods are based on the use of training sets with dense pose trajectories, such as large sets of views of the same object. For example, some such methods may assume views under 16- or 18-fold azimuth rotation and utilize additional 3D supervision. This may limit the applicability of such methods, as acquiring and annotating pose labels on natural images may be time-consuming and expensive. To avoid such a labeling process, novel view synthesis methods may be trained on and applied to ShapeNet. However, when applied to synthesizing new views of natural scenes, such as on KITTI (A. Geiger, P. Lenz, C. Stiller, and R. Urtasun, "Vision meets Robotics: The KITTI Dataset", The International Journal of Robotics Research, 32(11):1231-1237, 2013.) view changes may be restricted to a few frames and may still rely on viewpoint supervision.

Some recent work has been performed on human pose transfer, in which the goal is to transfer a person across poses. These examples may leverage the availability of multi-pose datasets such as DeepFashion (Z. Liu, P. Luo, S. Qiu, X. Wang, and X. Tang, "DeepFashion: Powering Robust Clothes Recognition and Retrieval with Rich Annotations", Proceedings of the IEEE conference on computer vision and pattern recognition, pages 1096-1104, 2016). However, besides viewpoints, these methods may assume key point supervision or leverage pre-trained dense human pose estimation networks. Thus, these methods may require additional supervision and may only be applicable to human poses.

Yet other examples attempt to reconstruct 3D information from 2D images using large-scale 3D CAD datasets, such as ShapeNet and Pix3D (X. Sun, J. Wu, X. Zhang, Z. Zhang, C. Zhang, T. Xue, J. B. Tenenbaum, and W. T. Freeman, "Pix3D: Dataset and Methods for Single-Image 3D Shape Modeling", Proceedings of the IEEE Conference on Computer Vision and Pattern Recognition, pages 2974-2983, 2018). However, such 3D reconstruction may assume 3D supervision.

Figure 2:
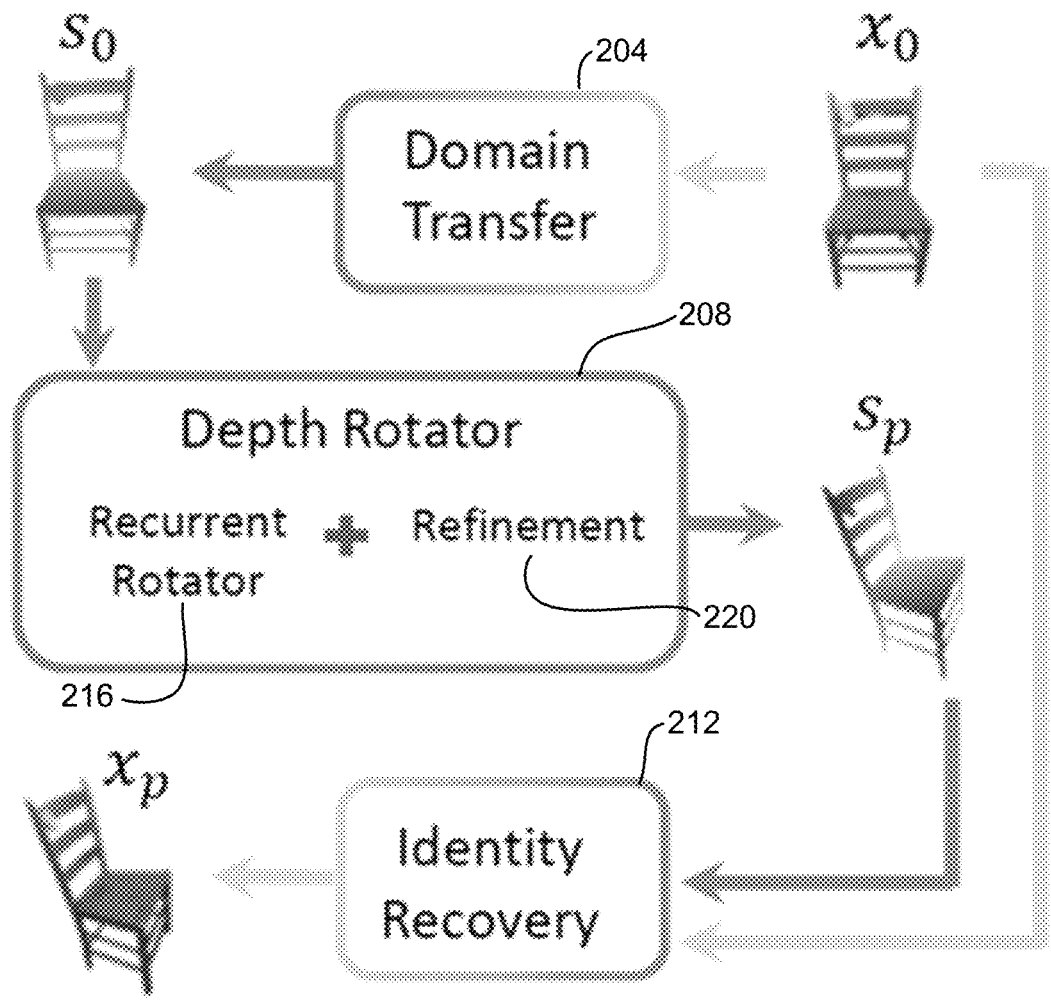
FIG. 2 schematically illustrates an example of a computer-implemented domain transferred view synthesis (DRAW) architecture.

In contrast to these methods, and as mentioned above, the disclosed examples synthesize, via execution of executable instructions on a computing system, a novel pose of an object when only one or a few images are available per object, as may be common in natural image datasets. This is illustrated in FIG. 1, where only a few images are available for each natural image trajectory. The disclosed examples leverage a densely populated synthetic pose trajectory to generate dense trajectories in the image domain. As described in more detail below, given a reference image $x_0$ of an object corresponding to an original viewpoint, a depth map $s_0$ is synthesized. A complete pose trajectory (e.g. $s_1, s_2, \ldots, s_N$) is then generated in a latent space of CAD-based depth maps. The pose trajectory in the CAD-based depth map space may be used to provide cross-modal guidance to model the pose trajectory in image space to thereby synthesize novel views of the object in image space. FIG. 2 illustrates a computer-implemented architecture of an example of a novel view synthesis system. The example architecture of FIG. 2 also may be referred to herein as a domain transferred view synthesis (DRAW) architecture. In the depicted architecture, a domain transfer module 204 is first used to translate a reference image $x_0$ of an object into a reference depth map $s_0$ of the object. A depth rotator 208 is then applied to synthesize a new depth map $s_p$ of the object corresponding to a new viewpoint. However, identity recovery may pose a new challenge. For example, as shown in FIG. 2, identity recovery may include disentanglement of shape and appearance components of the reference image $x_0$, and the combination of appearance information with the synthetically generated new depth map $s_p$ of the object's shape.

Accordingly, an identity recovery network 212 takes the reference image $x_0$ and the new depth map $s_p$ as inputs and predicts object views under combinations of domain (images vs. depth) and view angle (reference vs. $p^{th}$ view). The multiple predictions may force the network to more effectively disentangle shape and appearance information, enabling the synthesis of more realistic views of the reference object under new poses. This may enable DRAW to synthesize new views of natural objects without use of a training set of natural images with dense views.

Novel views of an object may be synthesized from a reference viewpoint defined, for example, by an azimuth and elevation angle in a spherical coordinate system, with the object in a center of a view sphere. In some examples, given a reference image $x_0$, N−1 consecutive views $x_p$ may be sampled at one altitude or elevation angle with azimuth angles spaced by $2\pi/N$ radians. While the examples disclosed herein refer to generating views at one altitude or elevation, it will also be appreciated that these examples may be extended to the synthesis of images from different elevations.

Real and synthetic data may be combined to exploit depth as a representation that bridges the natural and synthetic domains. For example, DRAW may leverage RGBD datasets, such as Pix3D or RGB-D, to learn mapping between image and depth domains. DRAW may also leverage the aforementioned synthetic datasets to learn how to synthesize new views. Rather than translating the reference view $x_0$ directly to the desired view $x_p$, an intermediate representation is introduced that comprises a depth map $s_p$ for each view $x_p$. However, the image and depth representation may not be paired. For example, the depth maps $s_p$ used to learn how to rotate objects in 3D may not have a one-to-one mapping to the images $x_p$. Instead, each depth map $s_p$ may be derived from one or more CAD models of objects in a same or similar class under a same or similar view.

The problem can thus be seen as one of domain adaptation, where data from a source domain $\mathbb{S}$ (CAD-based depth maps), for which view point annotations are available, may be used to improve performance of a task (view synthesis) in a target domain $\mathbb{T}$ (images), where such data is inaccessible. Thus, as illustrated by example in FIG. 2, view generation may be broken down into simpler tasks: a domain adaptation component, which maps images into depth maps and vice-versa, and a geometric component, implemented as a 3D rotation of the object.

In the example illustrated in FIG. 2, three modules are proposed to implement these tasks: a domain transfer module 204, a depth rotator module 208, and an identity recovery module 212. The domain transfer module 204 $\mathcal{F}$ establishes a mapping from the target domain $\mathbb{T}$ of natural images to the source domain $\mathbb{S}$ of depth maps, as follows:

$$\mathcal{F}: \mathbb{T} \to \mathbb{S} \quad (1)$$

$$x_0 \mapsto \mathcal{F}(x_0) = s_0 \quad (2)$$

where $x_0$ and $s_0$ are a reference image and a depth map of identical azimuth angle, respectively.

The depth rotator module 208 may implement, for $p=1, \ldots, N-1$:

$$\mathcal{G}(s_0, p) = s_p \quad (3)$$

The depth rotator module 208 takes the depth map $s_0$ associated with the original reference view and synthesizes depth maps for all other N-1 views. As illustrated by example in FIG. 2, this may be realized by two submodules: a recurrent rotator 216 and a refinement operator 220. The recurrent rotator 216 may generate novel depth map views. The refinement operator 220 may leverage information from all synthesized depth maps to refine each of them. The identity recovery module 212 implements $$\mathcal{H}: \mathbb{T} \times \mathbb{S} \to \mathbb{T} \quad (4)$$

$$(x_0, s_p) \mapsto \mathcal{H}(x_0, s_p) = x_p \quad (5)$$

taking, as input, the original reference view $x_0$ and the synthesized depth map $s_p$ to produce the synthesized view $x_p \in \mathbb{T}$. In this manner, the identity recovery module 212 may recover an identity of $x_0$ under a viewpoint of $s_p$.

With reference again to equations (1) and (2), the domain transfer model $\mathcal{F}$ may be learned using a dataset with paired images and depth maps, such as Pix3D. This may make learning the domain transfer model similar to learning a standard domain transfer problem, where the domain transfer model receives a natural image (e.g. in RGB) and outputs a depth map. Any suitable image style transfer model may be used to perform such a transfer.

Figure 3:
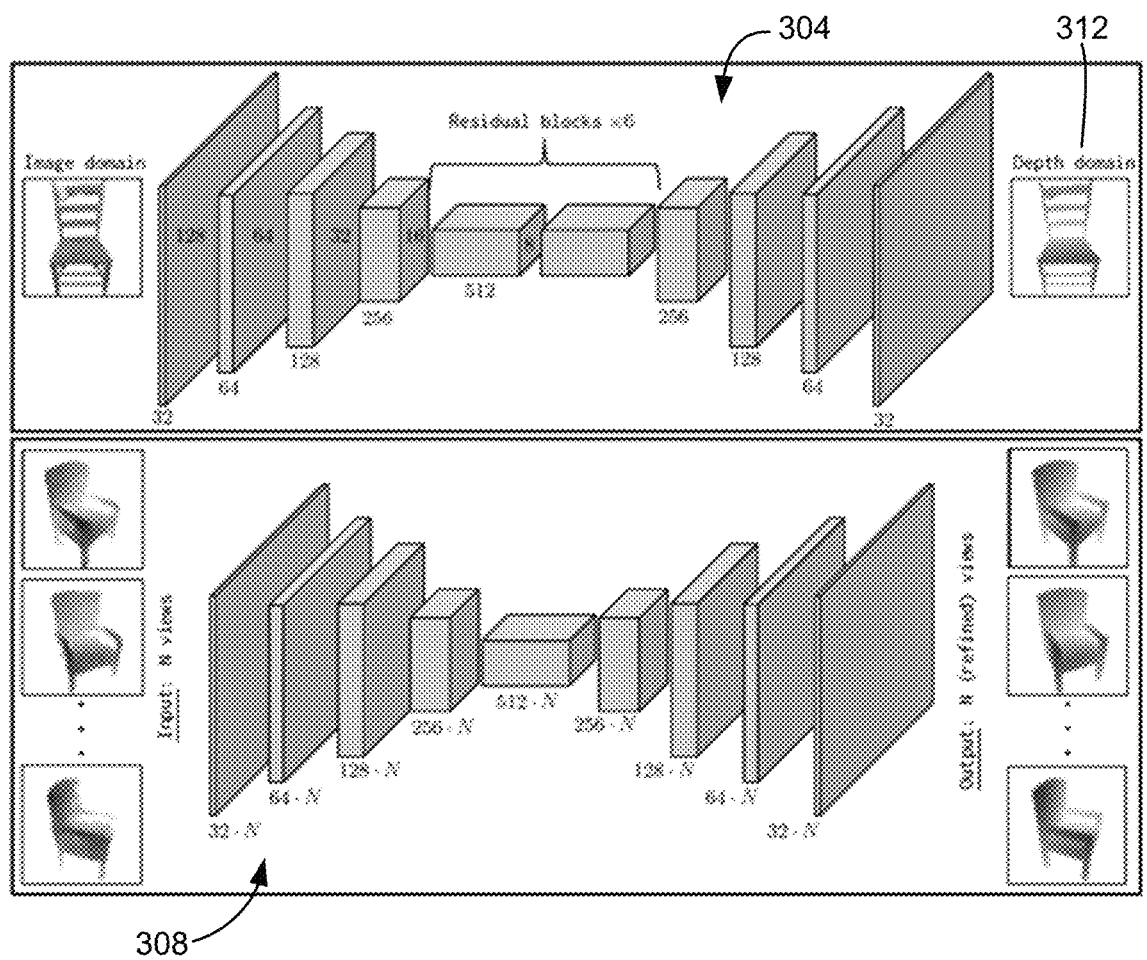
FIG. 3 shows one example of a domain transfer model.

FIG. 3 shows an example architecture of a computer-implemented domain transfer module 304 and a 3D refinement module 308. The architecture shown in FIG. 3 is a fully convolutional neural network, which may be implemented with ResNet blocks in some examples. The domain transfer model 304 outputs a depth map and a foreground mask that identifies pixels associated with the object. An object depth map 312 may be obtained by combination of the depth map and the foreground mask. In some examples, using the foreground mask may result in obtaining a cleaner object depth map, which may lead to improved depth rotation performance.

In some examples, a quality of the synthesized depth map $\mathcal{F}(x_0)$ may be assessed by an $L_1$ (least average deviations) loss, such as:

$$\|s_o - \mathcal{F}(x_0)\|_1 \quad (6)$$

In some examples, the $L_1$ loss may be complemented with an adversarial loss that discriminates between synthesized and real depth maps. The adversarial loss may be implemented with a pair-wise discriminator D between the original depth map $s_o$ and synthesized depth maps, conditioned on $x_0$. The domain transfer module may be trained by iterating between learning the discriminator with loss and learning the mapping function $\mathcal{F}$ with loss. For example, equation (7) shows one example of a loss function for the discriminator:

$$\mathcal{L}_{DT}^{critic}(D) = \mathbb{E}_{x_0, s_0}[(1-D(x_0, s_0))^2] + \mathbb{E}_{x_0}[(D(x_0, \mathcal{F}(x_0)))^2] \quad (7)$$

Equation (8) shows one example of a loss function for the mapping function $\mathcal{F}$:

$$\mathcal{L}_{DT}(\mathcal{F}) = \mathbb{E}_{x_0, s_0}[\|s_o - \mathcal{F}(x_0)\|_1] + \lambda^{\mathcal{F}} \mathbb{E}_{x_0}[(1-D(x_0, \mathcal{F}(x_0)))^2] \quad (8)$$

In equation (8), $\lambda^{\mathcal{F}}$ represents a multiplier which may be selected to balance a contribution of each component of $\mathcal{L}_{DT}(\mathcal{F})$.

Adding adversarial loss when learning the discriminator and the mapping function may help to enforce both sharpness of output and consistency between input and output. Accordingly, this approach may be applied to learning any suitable module described herein.

Introducing depth as an intermediate representation for image translation transforms view rotation into a geometric operation that can be learned from datasets of CAD models. Rather than reconstructing pixel depths from an appearance map, such as using a dense appearance flow model, novel depth views may be synthesized from a reference depth view $s_0$. This approach may leverage CAD datasets that have many views per object with known view angles.

After performing domain transfer, novel depth views may be generated with a combination of a depth map generator and 3D refinement module. The depth generator may be based on a recurrent network, which takes the original depth map $s_o$ as input and outputs a sequence of depths maps, as follows:

$$s_p = \mathcal{G}(s_0, p) \text{ for } p=1, \ldots, N-1 \quad (9)$$

In equation (9), $\mathcal{G}_1$ represents a depth map generator function and p is the azimuth angle. The depth generator may implement any suitable function. For example, $\mathcal{G}_1$ may be based on ConvLSTM with skip connections between one or more input and output layers, as described in in S.-H. Sun, M. Huh, Y.-H. Liao, N. Zhang, and J. J. Lim, "Multi-view to Novel view: Synthesizing novel views with Self-Learned Confidence", Proceedings of the European Conference on Computer Vision (ECCV), pages 155-171, 2018. Given a set of depth maps $\{s_0, s_1, \ldots, s_{N-1}\}$ from N viewpoints, the depth generator may aim to minimize loss. One example of a loss function for the depth generator is as follows:

$$\mathcal{L}_{RecGen}(\mathcal{G}_1) = \Sigma_{p=0}^{N-1} \mathbb{E}_{s_0}[\|s_p - \mathcal{G}_1(s_o,p)\|_1] \quad (10)$$

The refinement module 220 may enforce consistency among neighboring views via a 3D convolutional neural network that leverages information from nearby synthesized views to refine each synthesized view. For example, the N depth maps synthesized by the depth rotator module may be stacked into a 3D volume s' as represented by equation (11):

$$s' = s'_0 \oplus s'_1 \oplus \ldots \oplus s'_{N-1} \quad (11)$$

In equation (11), $\oplus$ denotes concatenation along a third dimension. In some examples, to ensure refinement of end views (e.g. $s_{N-1}$), cyclic padding may be used on the third dimension. The volume s' may be processed by equation (12):

$$s'' = \mathcal{G}_2(s') \quad (12)$$

$\mathcal{G}_2$ may be implemented by multiple layers of 3D convolutions with skip connections to produce a 3D volume of concatenated refined depth maps:

$$s'' = s''_0 \oplus s''_1 \oplus \ldots \oplus s''_{N-1} \quad (13)$$

3D refinement may be supervised by an $L_1$ loss function, such as:

$$\mathcal{L}_{3D}(\mathcal{G}_2) = \Sigma_{p=0}^{N-1} \mathbb{E}_{s''}[\|s_p - s''\|_1] \quad (14)$$

The $L_1$ loss may be complemented by an adversarial loss based on a pair-wise volume discriminator $D_v$ between the CAD-based depth map volume s and the synthesized volume s'', conditioned on s'. Equation (15) gives one example of discriminator loss:

$$\mathcal{L}_V^{critic}(D_V) = \mathbb{E}_{s',s}[(1-D_V(s',s))^2] + \mathbb{E}_{s',s''}[(D_V(s',s''))^2] \quad (15)$$

$\mathcal{G}_1$ and $\mathcal{G}_1$ may be supervised by:

$$\mathcal{L}_{DR}(\mathcal{G}_1, \mathcal{G}_2) = \mathcal{L}_{RecGen}(\mathcal{G}_1) + \lambda_{3D}\mathcal{L}_{3D}(\mathcal{G}_2) + \lambda_G \mathbb{E}_{s',s''}[(1-D_V(s',s''))^2] \quad (16)$$

In past domain transfer methods, as described above, source and target domains may be mapped in a one-to-one manner, in which each example in the source domain produces a different image in the target domain. This is not the case for the transfer between images and depth maps in the disclosed examples since, as illustrated in FIG. 1, objects of the same shape may have different appearances. As such, the mapping between images and depth maps may not be bijective. While this may not pose issues for the domain transfer module, which implements a many-to-one mapping, it may imply difficulties in recovering an object's identity uniquely from the object's depth map. Thus, in addition to the depth map $s_p$, the identity recovery model may also have access to the original reference image $x_0$, implementing the mapping $\mathcal{H}$ of equation (4).

In a supervised regression setting, this mapping may be learned from triplets $(x_0, s_p, x_p)$. However, such data sets may be difficult to locate or assemble. It even may be difficult to find datasets comprising multiple views of the same object with viewpoint annotations. For example, datasets such as Pix3D may have only a few views per object, and the views may not be aligned (i.e. the views may change from object to object). In view of the lack of such data, $\mathcal{H}$ may be learned from unpaired data, which is more challenging than image-to-image transfer, as learning from unpaired data involves $\mathcal{H}$ disentangling the appearance and shape information of $x_0$ and combining the appearance information with the shape information of $s_p$.

To perform this disentangling and combining, an encoder-decoder architecture may be employed. The encoder disentangles its input into a pair of shape and appearance parameters via a combination of a structure predicator and an appearance predictor. The structure predictor implements mapping as in equation (17) from an input image x to shape parameters p:

$$p = \mathcal{P}(x) \quad (17)$$

Likewise, the appearance predictor may implement mapping as in equation (18) from the input image x to appearance parameters a:

$$a = \mathcal{A}(x) \quad (18)$$

The decoder combines these parameters into a reconstruction on its output by taking a vector of concatenated appearance and shape parameters and decoding this latent representation into an image.

While the shape of the object is captured by both the image and depth map, the appearance is captured only by the image. This difference may be exploited to force disentanglement. For example, combining shape information derived from domain A with appearance information derived from domain B and reconstructing may produce an image of the object in domain B under the view used in domain A. Hence, using both the image and shape domains as A and B, it may be possible to synthesize images with the four possible combinations of domain (image vs. depth map) and view (reference vs. target). By matching each of these four classes of synthesized images to true images of the four classes, networks may learn to disentangle and combine the shape and appearance representations.

Figure 4:
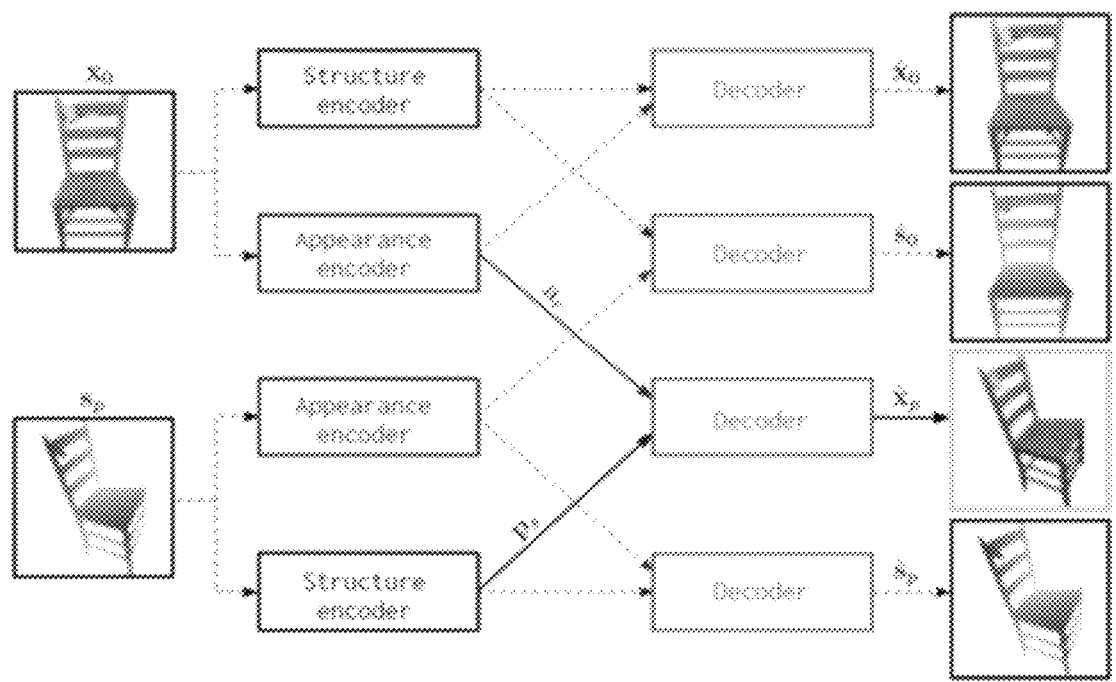
FIG. 4 shows one example of an identity recovery model comprising an encoder-decoder architecture for various combinations of domain and view.

In the multi-view setting, the four combinations may not be available, as $x_p$ is the prediction target. However, this idea may be implemented with the remaining three combinations: reference image ($x_0$), reference depth map ($s_0$) and target view depth map ($s_p$). FIG. 4 shows an example of a computer-implemented identity recovery model comprising an encoder-decoder architecture for various combinations of domain and view. In the example of FIG. 4, dashed lines identify data flow during training and solid arrows identify data flow during inference. The encoders illustrated in FIG. 4 may be applied to the reference image $x_0$ and the depth map $s_p$. This may result in a pair of shape and appearance parameters for each input:

$$p_r = \mathcal{P}(x_0) \quad (19)$$

$$a_r = \mathcal{A}(x_0) \quad (20)$$

$$p_s = \mathcal{P}(s_p) \quad (21)$$

$$a_s = \mathcal{A}(s_p) \quad (22)$$

The decoders may then be applied to the four possible combinations of these parameter vectors, synthesizing four images as follows:

$$\widehat{x_0} = \text{Dec}(p_r, a_r) \quad (23)$$

$$\widehat{s_0} = \text{Dec}(p_r, a_s) \quad (24)$$

$$\widehat{x_p} = \text{Dec}(p_s, a_r) \quad (25)$$

$$\widehat{s_p} = \text{Dec}(p_s, a_s) \quad (26)$$

As shown in the right side of FIG. 4, Eq. (23)-(26) are all possible combinations of shape and appearance from the real reference image $x_0$ with shape and appearance from the corresponding depth map. To force disentanglement into shape and appearance, the structure predictors, appearance predictors, and decoders share parameters. This implies that one encoder and one decoder is effectively learned. During inference, the target image $x_p$ is obtained as follows:

$$\widehat{x_p} = \text{Dec}(\mathcal{P}(s_p), \mathcal{A}(x_0)) \quad (27)$$

The identity recovery model may be trained using a mix of supervised and unsupervised learning. Since $x_0$, $s_0$, and $s_p$ are available, they may provide direct supervision for synthesizing the combinations $\widehat{x_0}$, $\widehat{s_0}$, and $\widehat{s_p}$, respectively. This may be encoded into a supervised loss function:

$$\mathcal{L}_{IR}^S = \mathbb{E}_{x_0, s_0, s_p}[\|x_0 - \widehat{x_0}\|_1 + \|s_0 - \widehat{s_0}\|_1 + \|s_p - \widehat{s_p}\|] \quad (28)$$

In some examples, equation (28) may be complemented by an adversarial loss where the combinations $(x_0, \widehat{s_0})$, $(\widehat{x_0}, s_0)$ and $(\widehat{x_p}, s_p)$ are considered as fake pairs, to be indistinguishable from real pair $(x_0, s_0)$. Such a pairwise discriminator may be trained with the following loss function:

$$\mathcal{L}_{IR}^{critic}(D) = \mathbb{E}_{x_0, s_0}[(1 - D(x_0, s_0))^2] + \mathbb{E}_{x_0, s_p}[(D(x_0, \widehat{s_0}))^2] + \mathbb{E}_{x_0, s_0}[(D(\widehat{x_0}, s_0))^2] + \mathbb{E}_{x_0, s_p}[(D(\widehat{x_p}, s_p))^2]. \quad (29)$$

The encoder and decoder may be learned with loss:

$$\mathcal{L}_{IR}(\mathcal{H}) = \mathbb{E}_{x_0, s_p}[(1 - \mathcal{D}(x_0, \widehat{s_0}))^2] + \mathbb{E}_{x_0, s_p}[1 - (\mathcal{D}(\widehat{x_0}, s_0))^2] + \mathbb{E}_{x_0, s_p}[1 - (\mathcal{D}(\widehat{x_p}, s_p))^2] + \mathcal{L}_{IR}^S \quad (30)$$

DRAW may be trained in two stages to decouple domain transfer and viewpoint synthesis. The depth rotator module $\mathcal{G}$ and its discriminator $D_V$ may be optimized with loss. Any suitable 2D image reconstruction loss may be used, such as that shown above in equation (10). Once $\mathcal{G}$ is trained, it may be frozen and embedded into the system of FIG. 2.

The training of the domain transfer and identity recovery modules may then be addressed in an end-to-end manner, using equation (31) as a loss function to train discriminators and equation (32) as a loss function to train the domain transfer and identity recovery parts $$\mathcal{L}(D) = \mathcal{L}_{DT}^{critic}(D) + \lambda_2 \mathcal{L}_{IR}^{critic}(D) \quad (31)$$

$$\mathcal{L}(\mathcal{F}, \mathcal{H}) = \mathcal{L}_{DT}(\mathcal{F}) + \lambda_1 \mathcal{L}_{IR}(\mathcal{H}) \quad (32)$$

The DRAW model was evaluated using a combination of the natural image Pix3D dataset and the synthetic 3D CAD ShapeNet dataset. To assure diversity of view angles and identities in both datasets, DRAW was evaluated on two categories: chairs and tables.

First, each module of DRAW was evaluated separately on the chair category. Domain transfer was evaluated between Pix3D and ShapeNet, view synthesis was evaluated on ShapeNet, and identity recovery on Pix3D. The $L_1$ and structural similarity measure (SSIM) were used as quantitative synthesis metrics.

As described in more detail below with reference to FIG. 10, the performance of the whole DRAW model, trained with Pix3D and ShapeNet, was compared to three other view synthesis models trained on ShapeNet and fine-tuned on Pix3D. Model 10-1 is described in M. Tatarchenko, A. Dosovitskiy, and T. Brox, "Single-view to Multi-view: Reconstructing Unseen Views with a Convolutional Network", arXiv:1511.06702, 6, 2015. Model 10-2 is described in T. Zhou, S. Tulsiani, W. Sun, J. Malik, and A. A. Efros, "View Synthesis by Appearance Flow", European conference on computer vision, pages 286-301, Springer, 2016. Model 10-3 is described in S.-H. Sun, M. Huh, Y.-H. Liao, N. Zhang, and J. J. Lim, "Multi-view to Novel view: Synthesizing novel views with Self-Learned Confidence", Proceedings of the European Conference on Computer Vision (ECCV), pages 155-171, 2018.

An inception score on pose was used to quantify synthesized image quality. The inception score may compute KL divergence between conditional label distribution and marginal distribution to evaluate quality and diversity of generated images among categories. An inception network trained for classification was used to provide label distribution. For view synthesis, the goal was to provide pose diversity rather than category diversity. As such, the inception model was trained to classify 18 different azimuth angles on ShapeNet, and the pose label predicted distribution was used to calculate the following inception score:

$$\exp(\mathbb{E}_x[KL(p(y|x)\|p(y))]). \quad (33)$$

On ShapeNet, 72 images of dimension of 256×256 were synthesized per each CAD model, using 18 azimuth angles and elevations of {0°, 10°, 20°, 30°}. For training, 558 objects were used, while 140 were used for testing. Pix3D combines 2D natural images and 3D CAD models. Images and depth maps form Pix3D were cropped and resized to dimension 256×256. It will be appreciated that, although DRAW may not require multiple images aligned with each object, these may be useful to evaluate identity recovery. Training and test sets were split based on objects to ensure that images with the same object will not appear in both training and testing. This resulted in 758 training images from 150 objects and 140 test images from 26 objects.

Figure 5:
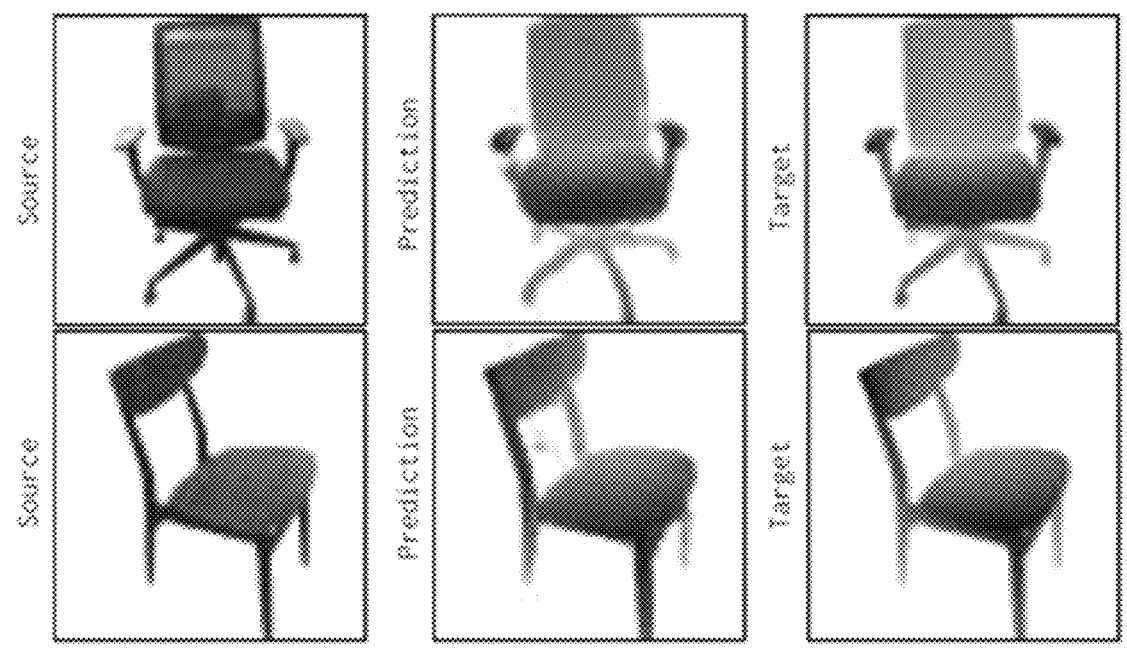
FIG. 5 shows example inputs and outputs from a domain transfer model.

With reference now to FIG. 5, an example is illustrated showing some inputs and outputs of the computer-implemented domain transfer module. FIG. 5 shows a source image, a predicted depth map, and a target depth map for two images of chairs. As illustrated by example in FIG. 5, the predicted depth maps output by the domain transfer module may be fairly close to ground truth (e.g. the source images).

The depth rotator and 3D refinement were compared to a depth rotator without the 3D refinement. Both models were trained on the 18 ShapeNet views. Given a reference depth map, the models were tasked with synthesizing the remaining 17 depth maps.

Figures 6, 7:
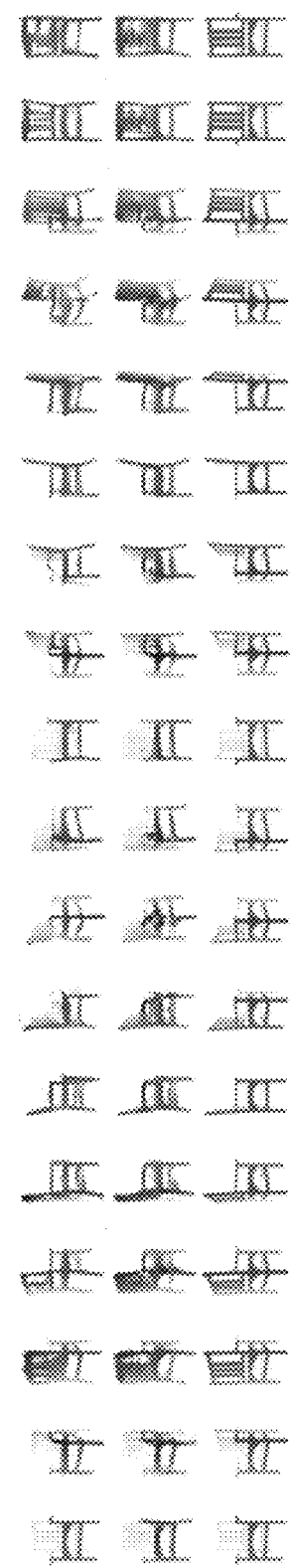
FIG. 6 shows example images of rotated depth maps compared to ground truth images.
FIG. 7 shows an example comparison of $L_1$ and SSIM scores of a depth rotator with and without 3D refinement.

FIG. 6 shows example images of computer-generated rotated depth maps compared to ground truth images. As illustrated by example in FIG. 6, depth maps output by the depth rotator may be close to the ground truth, but refinement may improve rendering of fine shape details.

FIG. 7 shows an example comparison of the $L_1$ and SSIM scores of the computer-implemented depth rotator with and without 3D refinement. For $L_1$, lower values indicate higher quality depth maps. For SSM, higher values indicate higher quality depth maps. As illustrated by example in FIG. 7, refinement may improve both metrics under all views.

Figure 8:
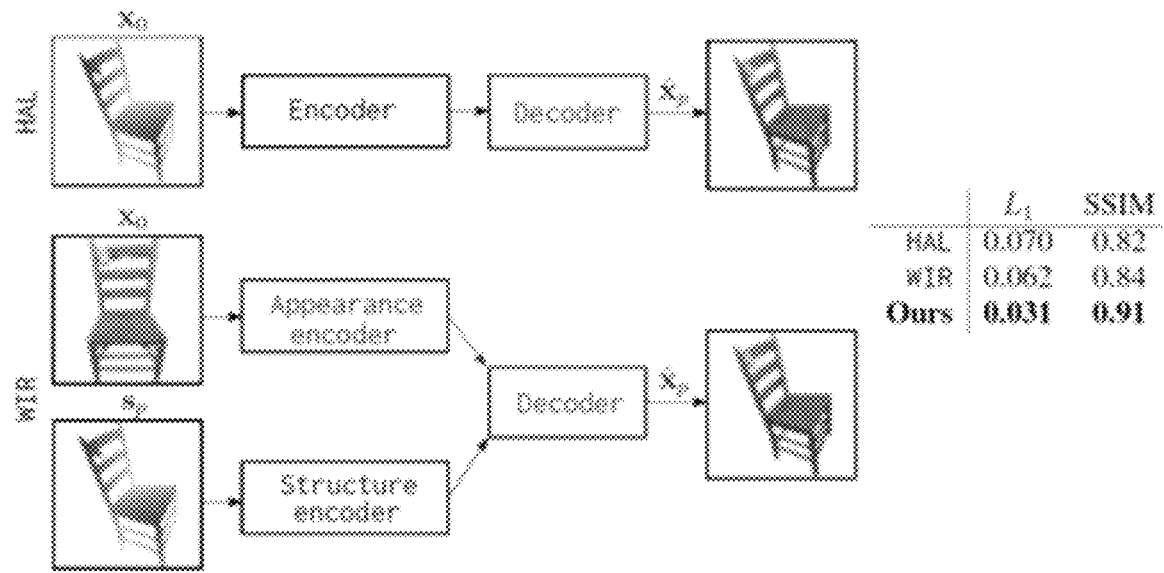
FIG. 8 shows an example of a simple image-to-image translation model (HAL) and an example of a weak identity recovery module (WIR).

With reference now to FIG. 8, two baseline identity recovery models were compared to the identity recovery model of FIG. 4. FIG. 8 shows an example of a simple computer-implemented image-to-image translation hallucination (HAL) model and an example of a computer-implemented weak identity recovery (WIR) module. The HAL model simply treats identity recovery as an image-to image translation problem. The HAL model may only have access to the depth map $s_p$ of an object. As such, the HAL model may hallucinate the object's appearance. The WIR model is a simple variant of the identity recovery model of FIG. 4. The WIR model receives both $x_0$ and $s_p$, but may use fewer and/or weaker disentanglement constraints than the identity recovery model of FIG. 4 because it may not require the synthesis of all combinations of shape and appearance.

All models were trained on pairs of RGB-D images corresponding to different viewpoints of the same object in Pix3D. During inference, an RGB image from a first view and a depth map from a second view were used to predict an RGB image from the second view. Due to the lack of supervision for target RGB images, HAL and WIR were optimized using adversarial loss alone.

FIG. 8 also lists a quantitative comparison of all three identity recovery models. As shown in FIG. 8, HAL has weak performance. Among the two identity recovery models, the additional disentanglement constraints of the identity recovery model of FIG. 4 leads to a performance improvement over WIR.

Figure 9:
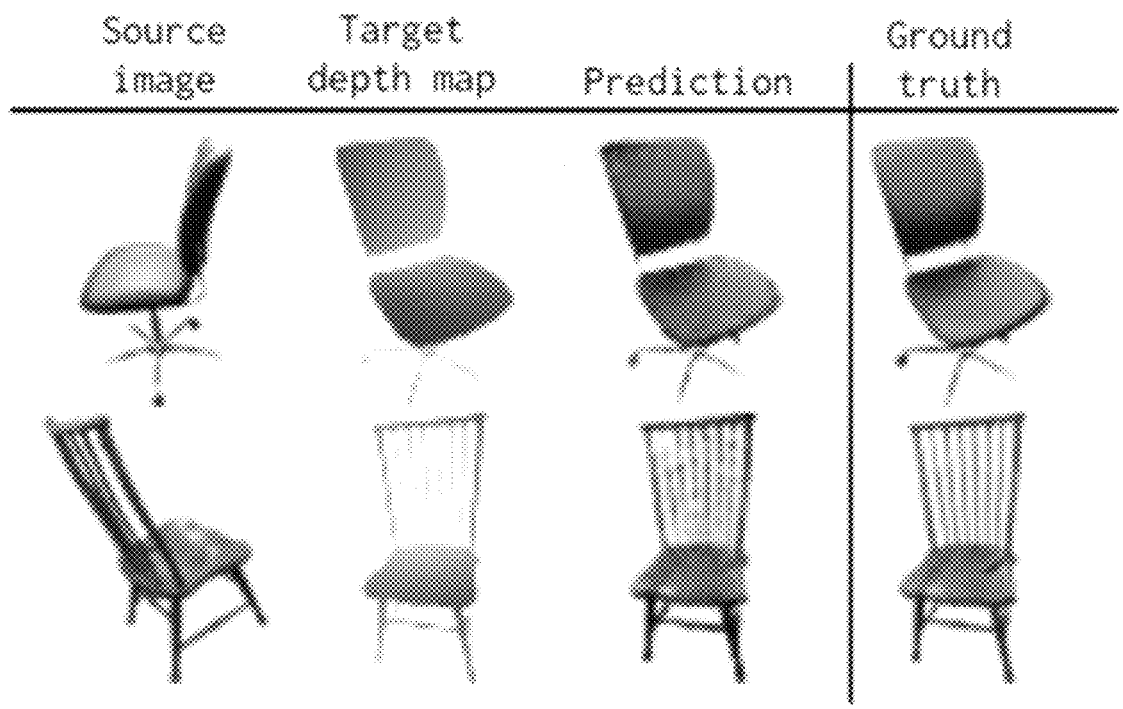
FIG. 9 shows two examples of a source image (reference image) of an object, target depth map (new depth map), and a prediction (new image) of the object, compared to a ground truth image of the object.

FIG. 9 shows two examples of a source image (reference image) of an object, a computer-generated target depth map target depth map (new depth map), and a computer-generated prediction (new image) of the object synthesized by identity recovery, compared to a ground truth image of the object. As illustrated by example in FIG. 9, the quality of synthesis may be high across large view angle transformations.

Figure 10:
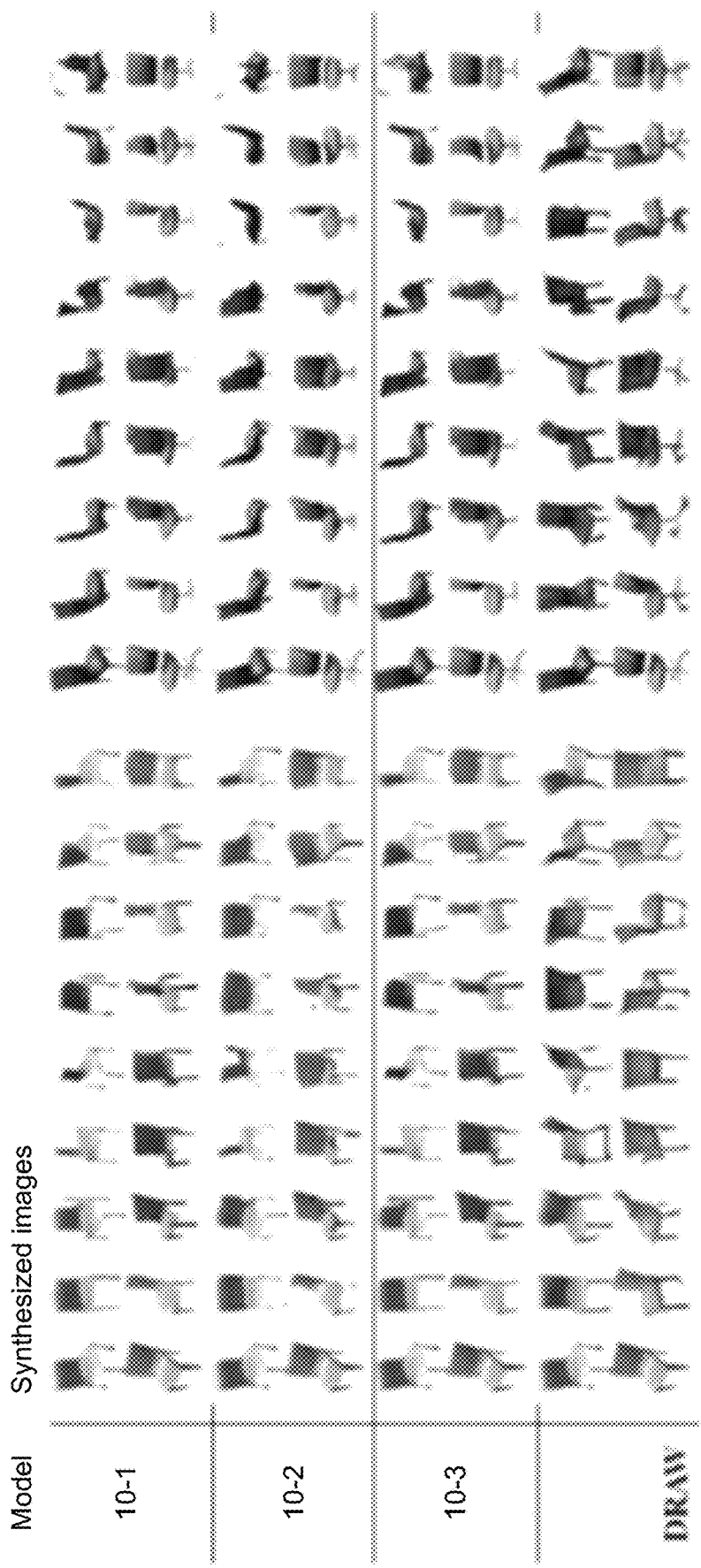
FIG. 10 shows a qualitative comparison of synthesized images output by DRAW to images output from other models.

With reference now to FIG. 10, synthesized images output by DRAW are qualitatively compared to images output from models 10-1, 10-2, and 10-3, referenced above. DRAW was optimized on Pix3D images with its shape rotator trained on ShapeNet. Model 10-3 was trained and tested with multiple views, but DRAW generated the entire trajectory of synthesized images shown in FIG. 10 from a single image.

Figures 11, 12:
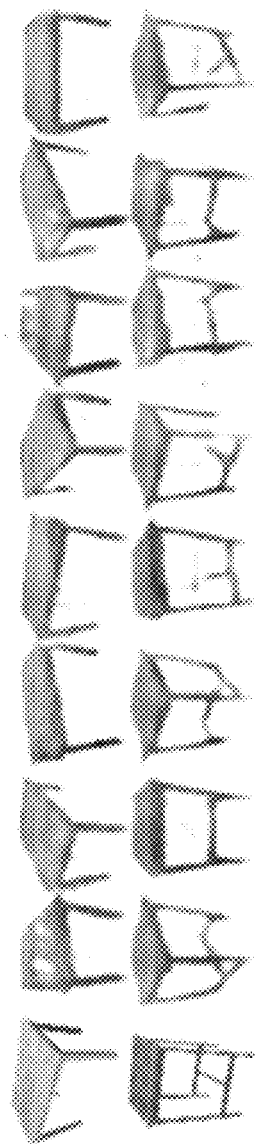
FIG. 11 shows view synthesis results for DRAW on table images.
FIG. 12 shows a comparison of view synthesis results on chairs from ShapeNet.

Due to absence of target images in this example, $L_1$ and SSIM were not calculated. Instead, the models were compared via the inception score, with results for the table category listed in Table 1. View synthesis results for DRAW on table images are shown in FIG. 11.

TABLE 1

Inception scores for models 10-1, 10-2, 10-3, and DRAW on table images from Pix3D.

|  | 10-1 | 10-2 | 10-3 | DRAW |
| --- | --- | --- | --- | --- |
| Inception score | 9.77 | 9.24 | 9.78 | 10.21 |

DRAW was compared to a pixel generation method (10-1), an appearance flow method (10-2), and another recent approach (10-3). These models were trained on ShapeNet and applied to Pix3D test images.

As shown in Table 1, DRAW achieved the highest inception score. Model 10-2 achieved relatively poor synthesis results. This may be due to challenging lighting and textures of natural images, which makes dense appearance flow mapping fundamentally different from that of the synthetic domain. Applying previous methods on a natural image dataset may require fine tuning with viewpoint annotation, whereas DRAW does not utilize such supervision.

For a comparison on ShapeNet, DRAW was trained using as domains images and depth maps both extracted from ShapeNet. The remaining methods were as above tested on the same images. FIG. 12 shows a comparison of view synthesis results on chairs from ShapeNet. As shown in FIG. 12, all results are comparable.

In summary, DRAW synthesizes a pose trajectory of an object from a reference image. This may be achieved using cross-modal pose trajectory transfer, based on i) mapping RGB images into 2D depth maps, ii) transforming the depth maps to simulate 3D object rotation and iii) re-mapping into image space. DRAW may be trained with a set of real images with sparse views, as in Pix3D, and ShapeNet. Pose trajectories may be synthesized in a synthetic domain and transferred to the image space in a manner that achieves consistency of object identity. An identity recovery network that disentangles and recombines appearance and shape information helps to achieve such consistency. A comparison with other methods of view synthesis shows that DRAW may produce better images in terms of quality, structural integrity and instance identity.

Figure 13A:
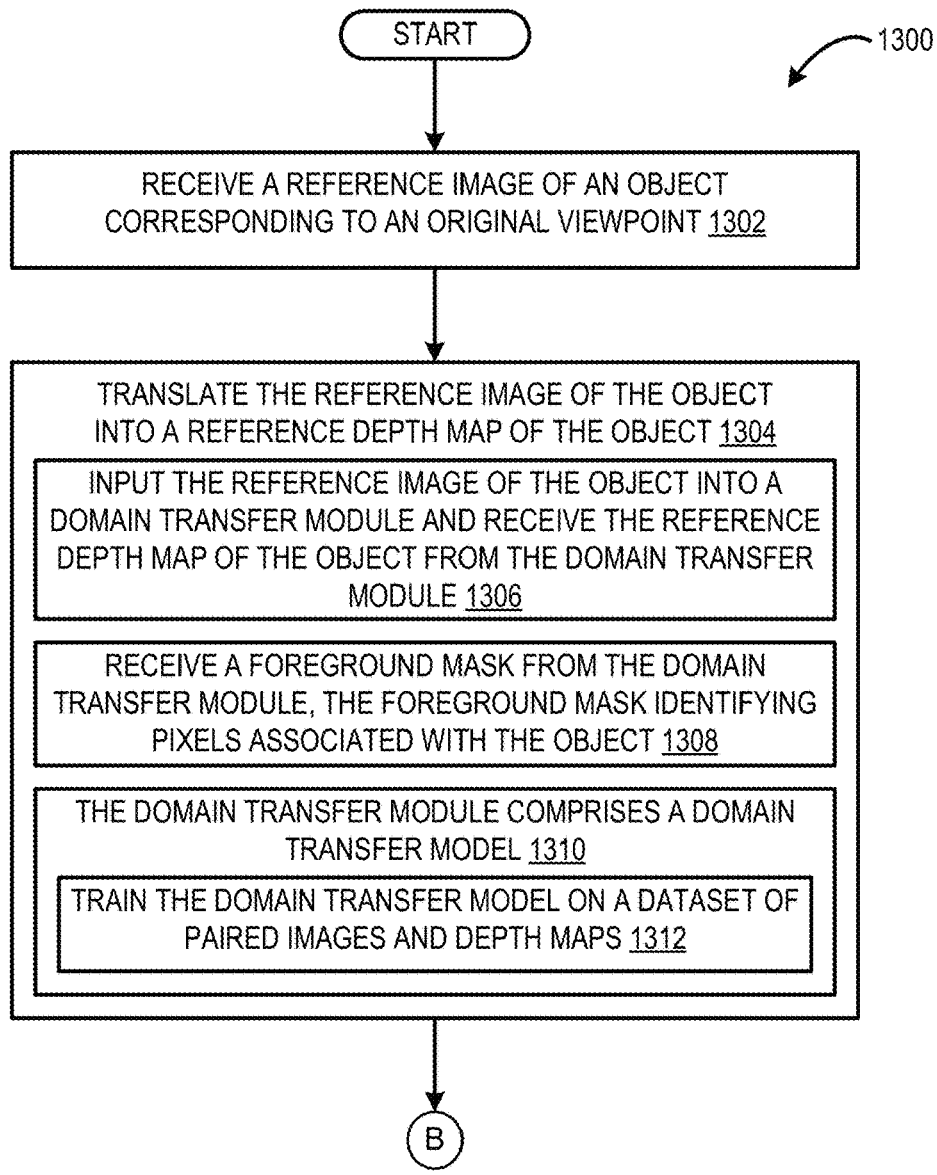
FIGS. 13A, 13B, and 13C illustrate a flow diagram depicting an example method for synthesizing a novel pose of an object.
Figure 13B:
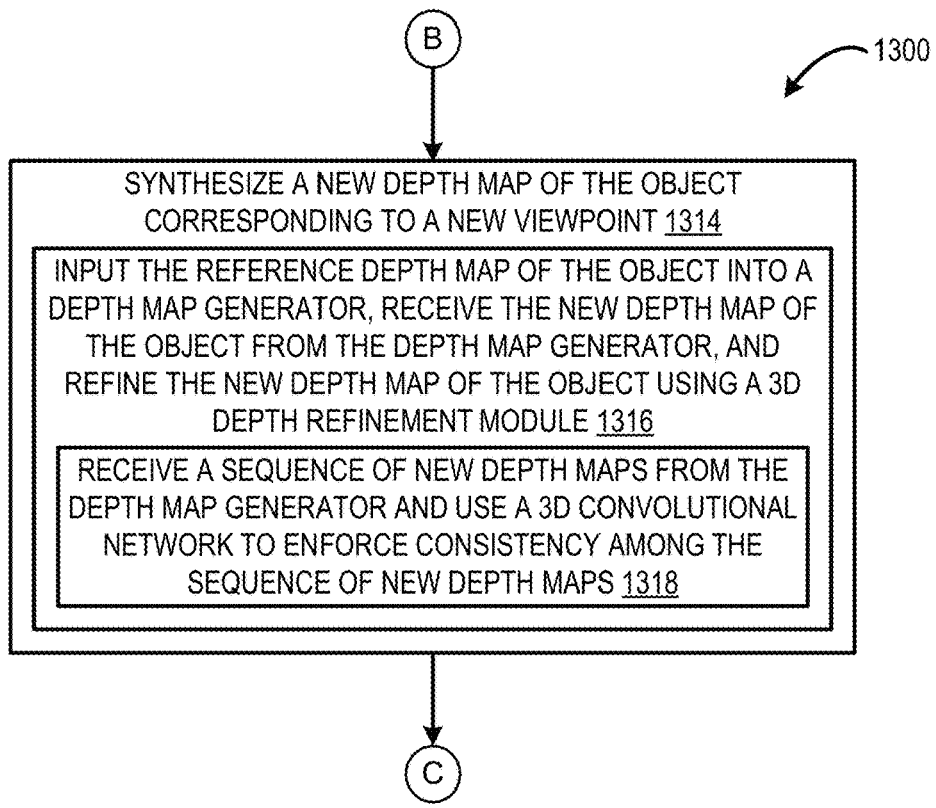
Figure 13C:
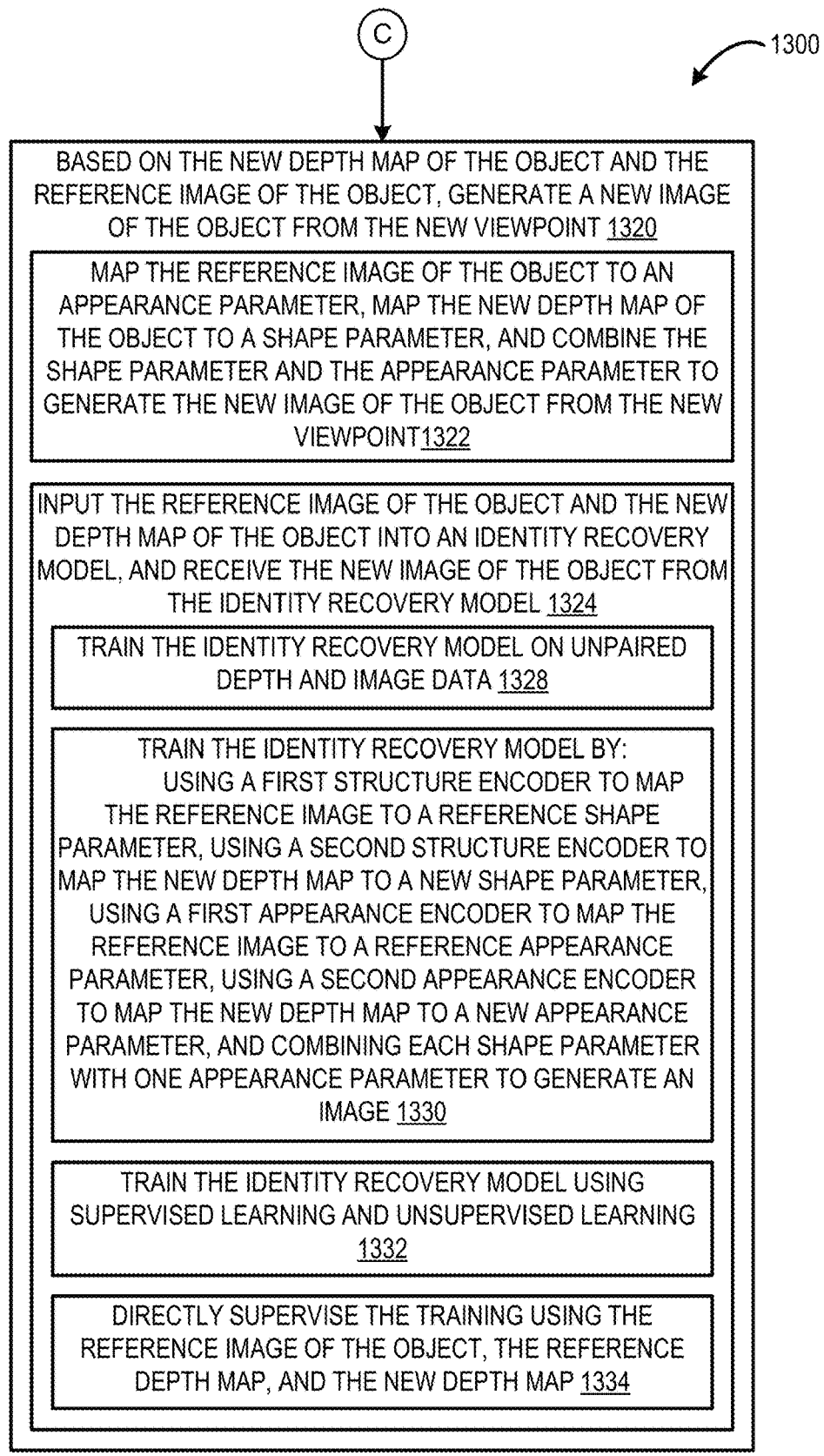

FIGS. 13A, 13B, and 13C show a flow diagram depicting an example of a computer-implemented method 1300 for synthesizing a novel pose of an object. The following description of method 1300 is provided with reference to the components described above and shown in FIGS. 1-12 and 14, but it will be appreciated that method 1300 also may be performed in other contexts using other suitable components.

With reference to FIG. 13A, at 1302, the method 1300 comprises receiving a reference image of an object corresponding to an original viewpoint. At 1304, the method 1300 comprises translating the reference image of the object into a reference depth map of the object. As illustrated at 1306, in some examples, translating the reference image of the object into the reference depth map of the object may comprise inputting the reference image of the object into a domain transfer module, and receiving the reference depth map of the object from the domain transfer module.

At 1308, the method 1300 may include receiving a foreground mask from the domain transfer module, the foreground mask identifying pixels associated with the object. As illustrated at 1310, in some examples, the domain transfer module comprises a domain transfer model. At 1312, the method 1300 may include training the domain transfer model on a dataset of paired images and depth maps.

With reference now to FIG. 13B, at 1314, the method 1300 comprises synthesizing a new depth map of the object corresponding to a new viewpoint. As illustrated at 1316, synthesizing the new depth map of the object corresponding to the new viewpoint may comprise inputting the reference depth map of the object into a depth map generator, receiving the new depth map of the object from the depth map generator, and refining the new depth map of the object using a 3D depth refinement module. At 1318, the method 1300 may comprise receiving a sequence of new depth maps from the depth map generator. In such an example, refining the new depth map may comprise using a 3D convolutional neural network to enforce consistency among the sequence of new depth maps.

With reference now to FIG. 13C, at 1320, the method 1300 comprises, based on the new depth map of the object and the reference image of the object, generating a new image of the object from the new viewpoint. In some examples, at 1322, generating the new image of the object may comprise mapping the reference image of the object to an appearance parameter, mapping the new depth map of the object to a shape parameter, and combining the shape parameter and the appearance parameter to generate the new image of the object from the new viewpoint.

As illustrated at 1324, generating the new image of the object may comprise inputting the reference image of the object and the new depth map of the object into an identity recovery model, and receiving the new image of the object from the identity recovery model. In some examples, as illustrated at 1328, the method 1300 may include training the identity recovery model on unpaired depth and image data. At 1330, the method 1300 may include training the identity recovery model by using a first structure encoder to map the reference image to a reference shape parameter, using a second structure encoder to map the new depth map to a new shape parameter, using a first appearance encoder to map the reference image to a reference appearance parameter, using a second appearance encoder to map the new depth map to a new appearance parameter, and combining each shape parameter with one appearance parameter to generate an image. At 1332, the method 1300 may include training the identity recovery model using supervised learning and unsupervised learning. In some examples, at 1334, the method 1300 may include directly supervising the training using the reference image of the object, the reference depth map, and the new depth map.

Figure 14:
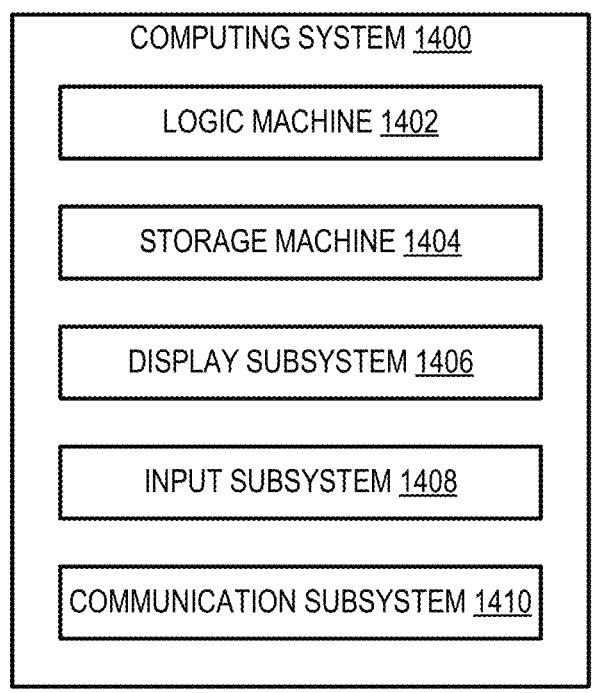
FIG. 14 shows a block diagram of an example computing system.

FIG. 14 schematically shows an example of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices.

Computing system 1400 includes a logic machine 1402 and a storage machine 1404. Computing system 1400 may optionally include a display subsystem 1406, input subsystem 1408, communication subsystem 1410, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1400 implemented to perform a particular function. In some cases, a program may be instantiated via logic machine 1402 executing instructions held by storage machine 1404. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1406 may be used to present a visual representation of data held by storage machine 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

Another example provides, enacted on a computing system, a method for synthesizing a novel pose of an object, the method comprising: receiving a reference image of an object corresponding to an original viewpoint; translating the reference image of the object into a reference depth map of the object; synthesizing a new depth map of the object corresponding to a new viewpoint; and based on the new depth map of the object and the reference image of the object, generating a new image of the object from the new viewpoint. Translating the reference image of the object into the reference depth map of the object may additionally or alternatively include inputting the reference image of the object into a domain transfer module; and receiving the reference depth map of the object from the domain transfer module. The method may additionally or alternatively include receiving a foreground mask from the domain transfer module, the foreground mask identifying pixels associated with the object. The domain transfer module may additionally or alternatively include a domain transfer model, and the method may additionally or alternatively include training the domain transfer model on a dataset of paired images and depth maps. Synthesizing the new depth map of the object corresponding to the new viewpoint may additionally or alternatively include inputting the reference depth map of the object into a depth map generator; receiving the new depth map of the object from the depth map generator; and refining the new depth map of the object using a 3D depth refinement module. The method may additionally or alternatively include receiving a sequence of new depth maps from the depth map generator and refining the new depth map may additionally or alternatively include using a 3D convolutional neural network to enforce consistency among the sequence of new depth maps. Generating the new image of the object may additionally or alternatively include mapping the reference image of the object to an appearance parameter; mapping the new depth map of the object to a shape parameter; and combining the shape parameter and the appearance parameter to generate the new image of the object from the new viewpoint. Generating the new image of the object may additionally or alternatively include inputting the reference image of the object and the new depth map of the object into an identity recovery model; and receiving the new image of the object from the identity recovery model. The method may additionally or alternatively include training the identity recovery model on unpaired depth and image data. Training the identity recovery model may additionally or alternatively include using a first structure encoder to map the reference image to a reference shape parameter; using a second structure encoder to map the new depth map to a new shape parameter; using a first appearance encoder to map the reference image to a reference appearance parameter; using a second appearance encoder to map the new depth map to a new appearance parameter; and combining each of the reference shape parameter and the new shape parameter with one of the reference appearance parameter and the new appearance parameter to generate an image. The method may additionally or alternatively include training the identity recovery model using supervised learning and unsupervised learning. The method may additionally or alternatively include directly supervising the training using the reference image of the object, the reference depth map, and the new depth map.

Another example provides a computing device comprising: a processor; and a storage device storing instructions executable by the processor to receive a reference image of an object corresponding to an original viewpoint; translate the reference image of the object into a reference depth map of the object; synthesize a new depth map of the object corresponding to a new viewpoint; and based on the new depth map of the object and the reference image of the object, generate a new image of the object from the new viewpoint. Translating the reference image of the object into the reference depth map of the object may additionally or alternatively include inputting the reference image of the object into a domain transfer module; and receiving the reference depth map of the object from the domain transfer module. The instructions may additionally or alternatively be executable to receive a foreground mask from the domain transfer module, the foreground mask identifying pixels associated with the object. Generating the new image of the object may additionally or alternatively include mapping the reference image of the object to an appearance parameter; mapping the new depth map of the object to a shape parameter; and combining the shape parameter and the appearance parameter to generate the new image of the object from the new viewpoint. Generating the new image of the object may additionally or alternatively include inputting the reference image of the object and the new depth map of the object into an identity recovery model; and receiving the new image of the object from the identity recovery model. Training the identity recovery model may additionally or alternatively include using a first structure encoder to map the reference image to a reference shape parameter; using a second structure encoder to map the new depth map to a new shape parameter; using a first appearance encoder to map the reference image to a reference appearance parameter; using a second appearance encoder to map the new depth map to a new appearance parameter; and combining each of the reference shape parameter and the new shape parameter with one of the reference appearance parameter and the new appearance parameter to generate an image. The instructions may additionally or alternatively be executable to directly supervise the training using the reference image of the object, the reference depth map, and the new depth map.

Another example provides a computing device comprising: a processor; and a storage device storing instructions executable by the processor to receive a reference image of an object corresponding to an original viewpoint; translate the reference image of the object into a reference depth map of the object; synthesize a new depth map of the object corresponding to a new viewpoint; map the reference image of the object to an appearance parameter; map the new depth map of the object to a shape parameter; and combine the shape parameter and the appearance parameter to generate a new image of the object from the new viewpoint.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a computing system, a method for synthesizing a novel pose of an object, the method comprising:
receiving a reference image of an object corresponding to an original viewpoint;
translating the reference image of the object into a reference depth map of the object;
synthesizing a new depth map of the object corresponding to a new viewpoint; and
inputting the reference image of the object and the new depth map of the object into an identity recovery model to generate a new image of the object from the new viewpoint.

2. The method of claim 1, wherein translating the reference image of the object into the reference depth map of the object comprises:
inputting the reference image of the object into a domain transfer module; and
receiving the reference depth map of the object from the domain transfer module.

3. The method of claim 2, further comprising receiving a foreground mask from the domain transfer module, the foreground mask identifying pixels associated with the object.

4. The method of claim 2, wherein the domain transfer module comprises a domain transfer model, the method further comprising training the domain transfer model on a dataset of paired images and depth maps.

5. The method of claim 1, wherein synthesizing the new depth map of the object corresponding to the new viewpoint comprises:
inputting the reference depth map of the object into a depth map generator;
receiving the new depth map of the object from the depth map generator; and
refining the new depth map of the object using a 3D depth refinement module.

6. The method of claim 5, further comprising receiving a sequence of new depth maps from the depth map generator, and wherein refining the new depth map comprises using a 3D convolutional neural network to enforce consistency among the sequence of new depth maps.

7. The method of claim 1, wherein generating the new image of the object comprises:
mapping the reference image of the object to an appearance parameter;
mapping the new depth map of the object to a shape parameter; and
combining the shape parameter and the appearance parameter to generate the new image of the object from the new viewpoint.

8. The method of claim 1, further comprising training the identity recovery model on unpaired depth and image data.

9. The method of claim 1, further comprising training the identity recovery model by:
using a first structure encoder to map the reference image to a reference shape parameter;
using a second structure encoder to map the new depth map to a new shape parameter;
using a first appearance encoder to map the reference image to a reference appearance parameter;
using a second appearance encoder to map the new depth map to a new appearance parameter; and
combining each of the reference shape parameter and the new shape parameter with one of the reference appearance parameter and the new appearance parameter to generate an image.

10. The method of claim 1, further comprising training the identity recovery model using supervised learning and unsupervised learning.

11. The method of claim 10, further comprising directly supervising the training using the reference image of the object, the reference depth map, and the new depth map.

12. A computing device comprising:
a processor; and
a storage device storing instructions executable by the processor to
receive a reference image of an object corresponding to an original viewpoint;
translate the reference image of the object into a reference depth map of the object;
synthesize a new depth map of the object corresponding to a new viewpoint; and
input the reference image of the object and the new depth map of the object into an identity recovery model to generate a new image of the object from the new viewpoint.

13. The computing device of claim 12, wherein the instructions are further executable to translate the reference image of the object into the reference depth map of the object by:
inputting the reference image of the object into a domain transfer module; and
receiving the reference depth map of the object from the domain transfer module.

14. The computing device of claim 13, wherein the instructions are further executable to receive a foreground mask from the domain transfer module, the foreground mask identifying pixels associated with the object.

15. The computing device of claim 12, wherein the instructions are further executable to generate the new image of the object by:
mapping the reference image of the object to an appearance parameter;
mapping the new depth map of the object to a shape parameter; and
combining the shape parameter and the appearance parameter to generate the new image of the object from the new viewpoint.

16. The computing device of claim 12, wherein the instructions are further executable to train the identity recovery model by:
using a first structure encoder to map the reference image to a reference shape parameter;
using a second structure encoder to map the new depth map to a new shape parameter;
using a first appearance encoder to map the reference image to a reference appearance parameter;
using a second appearance encoder to map the new depth map to a new appearance parameter; and
combining each of the reference shape parameter and the new shape parameter with one of the reference appearance parameter and the new appearance parameter to generate an image.

17. The computing device of claim 16, wherein the instructions are further executable to directly supervise the training using the reference image of the object, the reference depth map, and the new depth map.

18. A computing device comprising:
a processor; and
a storage device storing instructions executable by the processor to
receive a reference image of an object corresponding to an original viewpoint;

translate the reference image of the object into a reference depth map of the object;

synthesize a new depth map of the object corresponding to a new viewpoint; and input the reference image of the object and the new depth map of the object into an identity recovery model to generate a new image of the object from the new viewpoint, wherein the instructions are further executable to generate the new image of the object by:

mapping the reference image of the object to an appearance parameter;

mapping the new depth map of the object to a shape parameter; and combining the shape parameter and the appearance parameter to generate a new image of the object from the new viewpoint.

\* \* \* \* \*